April 2, 1957 H. ODEN 2,787,674

CIRCUIT ARRANGEMENT FOR THE AUTOMATIC TESTING OF LINES

Filed June 15, 1955 2 Sheets-Sheet 1

INVENTOR.
H. ODEN
BY
Robert Harding Jr.
ATTORNEY

April 2, 1957 H. ODEN 2,787,674

CIRCUIT ARRANGEMENT FOR THE AUTOMATIC TESTING OF LINES

Filed June 15, 1955 2 Sheets-Sheet 2

INVENTOR.

H. ODEN

BY Robert Harding Jr

ATTORNEY

United States Patent Office 2,787,674
Patented Apr. 2, 1957

2,787,674

CIRCUIT ARRANGEMENT FOR THE AUTOMATIC TESTING OF LINES

Hoeckley Oden, Stuttgart-Stammheim, Germany, assignor to International Standard Electric Corporation, New York, N. Y., a corporation of Delaware Application June 15, 1955, Serial No. 515,708
Claims priority, application Germany July 13, 1954
10 Claims. (Cl. 179—175.2)

The invention relates to a circuit arrangement for the automatic testing of lines with respect to their serviceability with the aid of a common testing arrangement allocated to a plurality of lines in telecommunication, particularly telephone systems.

Arrangements for the testing of lines are already known which, by means of a selector, automatically and periodically explore the lines to be tested and, when locating a fault which does not permit an unobjectionable operation, serve to block the lines in question. The blocking devices in such arrangements are individually associated with the different lines or means of transmission respectively, and are made effective by the said testing arrangement. Since during normal operation only a certain percentage of lines fail to operate on account of disturbances, the blocking devices, which are individually allocated to the lines, are in most cases not fully utilized.

It is one of the objects of the invention to provide a circuit arrangement for automatic testing of lines in which the number of blocking means is reduced to a minimum and therefore the cost of the apparatus is correspondingly decreased.

For carrying out the object of the invention an arrangement is suggested which assigns a plurality of blocking means to the said automatic testing arrangement, the number of said blocking means corresponding to the percentage of faults to be expected and said blocking means being allocated to the individual lines over switching means in the event of a disturbance. Because of this centralized arrangement of blocking devices the expense for these devices will be substantially reduced.

The above-mentioned and other features and objects of this invention and the manner of attaining them will become more apparent and the invention itself will be best understood by reference to the following description of an embodiment of the invention taken in conjunction with the accompanying drawings, in which:

Fig. 1 shows a group selecting stage GW, and outgoing repeater U*eg*, an incoming repeater U*ek*, a long-distance line F*ltg* lying in between, and an incoming group selecting stage GW*k* to which there is applied an automatic subscriber station *a*.T*ln*. In front of the outgoing repeater the automatic testing arrangement SP, if so required, is periodically interconnected through a finder MS.

Figure 2:
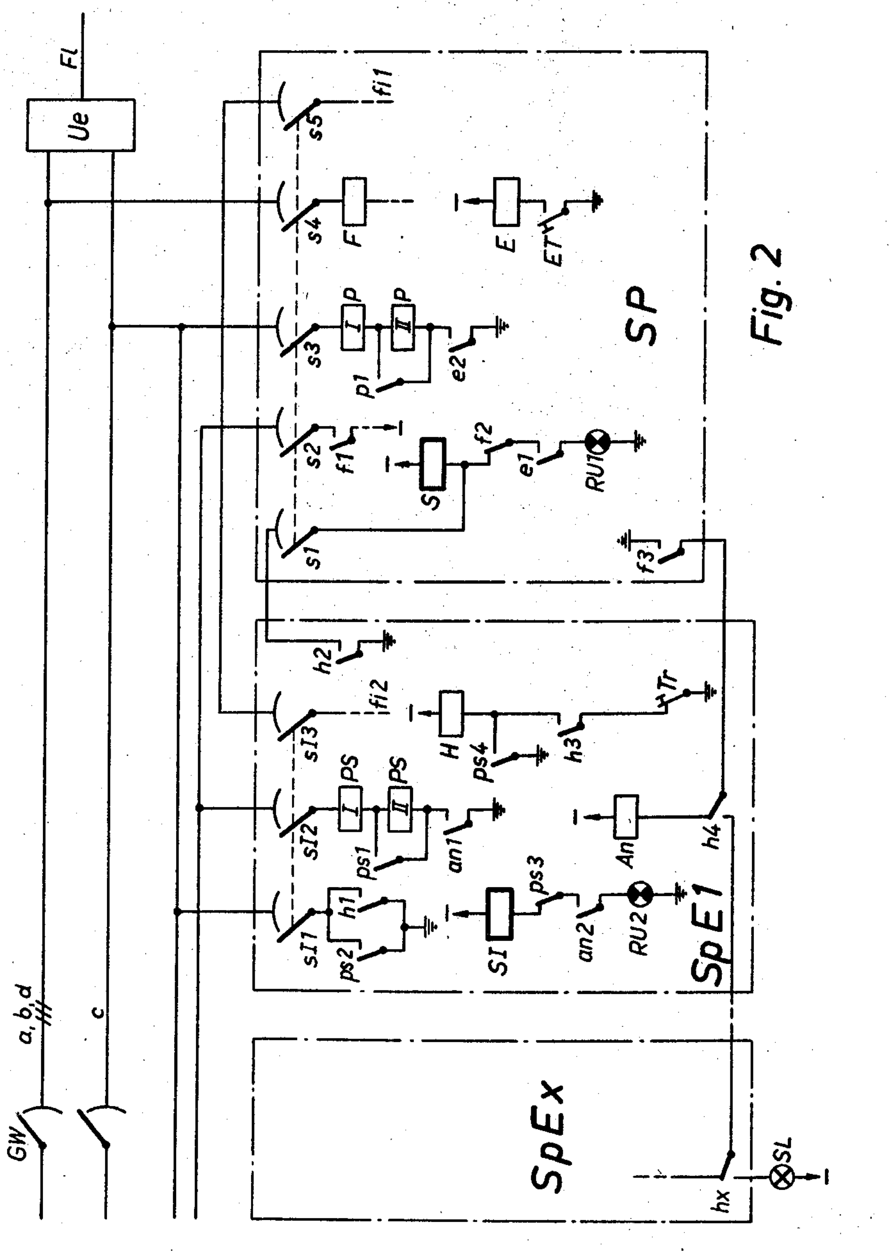
Fig. 2 shows a circuit arrangement from which there may be seen the mode of operation of the automatic testing arrangement and of the blocking means associated therewith.

In Fig. 2 there are shown details of the circuit for such an arrangement, i. e. an outgoing group selecting stage GW, leading e. g. with four wires *a, b, c, d* to an outgoing repeater U*e*.

When the automatic testing arrangement SP is desired to be set in operation, the switch-on button ET is depressed. The switch-on relay E will then close the circuit for the magnet S of the connecting device, via the relay interrupter RU1. The connecting device sets its wipers *s1* . . . *s5* in a step-by-step manner. During this operation the lines to be tested will be explored, via the wiper *s4*, so that when tracing a disturbed line, the fault indicating relay F will be energized in a circuit which has not been completely shown. This relay F will then disconnect the magnet S of the connecting device by means of its contact *f2* and will apply a test potential to an idle blocking device via another wiper *s2* by means of its contact *f1*. A plurality of blocking devices S*p*E1–S*p*E*x* are assigned to each automatic testing arrangement SP.

If it is assumed that the first one of the blocking devices is idle, the starting chain to the blocking devices will be switched on via contact *f3*, so that the starting relay A*n* of the first blocking device S*p*E1 will be energized. This relay A*n*, with its contact *an2*, will then energize the magnet SI of the finder which is associated with this particular blocking device. The finder will then trace the faulty line with the aid of its wipers SI1–3. This is effected by the automatic testing arrangement S*p* applying a test potential to the first blocking device S*p*E1 over the contact *f1* and the wiper *s2*. On account of this, the test relay PS in the first blocking device will be energized over the test wiper *s*I2, after this circuit had been prepared by the contact *an1*. This test relay PS controls the blocking and, when operated, short-circuits its winding II by means of contact *ps1*, disconnects the magnet SI of the finder with the aid of contact *ps3*, and applies a direct plus potential to the *c*-wire of the disturbed line with the aid of contact *ps2* via a wiper *s*I1 of the finder. By means of this potential the disturbed line is blocked to any further seizing.

By means of a further contact *ps4* of the test relay, an auxiliary relay H will be energized which immediately completes a holding circuit for itself with the aid of contact *h3*. Contact *h4* then switches the starting chain over to the next successive blocking device, so that when tracing another fault, the next successive blocking device can be made effective. Contact *h1* continues to maintain the application of the blocking potential to the disturbed line after the test relay (PS) of the first blocking device has dropped off by the opening of contact *h4* and the release of relay A*n*.

By means of contact *h2* and via the wiper *s1* of the automatic testing arrangement SP, a current impulse will be given onto the switching magnet S of the finder of the automatic testing arrangement, so that the latter will be stepped on for testing the next successive lines. During this operation also the fault indicating relay F will drop off, so that the switching magnet S of the finder will be stepped on via the relay interrupter RU1, the switch-on contact *e1*, and the reversed contact *f2*.

When tracing a fault with one of the successive lines the automatic testing arrangement will perform the same switching operations, but for blocking the disturbed line via the starting line there will be employed the next successive blocking device.

If all of the blocking devices are occupied or busy, then, after all of the contacts *h* are reversed, a signaling lamp SL will be lighted up over the starting chain, indicating that all of the blocking devices are busy. After removal of the disturbances from the individual lines, the blocking devices will be released again by depressing the cut-off buttons T*r* which are assigned thereto. For completing the automatic testing arrangement it is possible to provide special indicating signals relating to the kind of fault traced or located. This may be done by means of a circuit (not shown) closed by an additional wiper *s*5 of the testing arrangement SP and a special wiper *s*13 of the blocking device.

Figure 1:
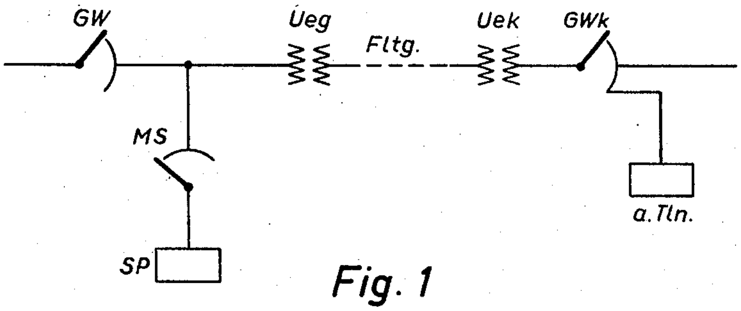
Fig. 1 shows a basic diagram for the arrangement of the automatic testing arrangement.
Figure 3:
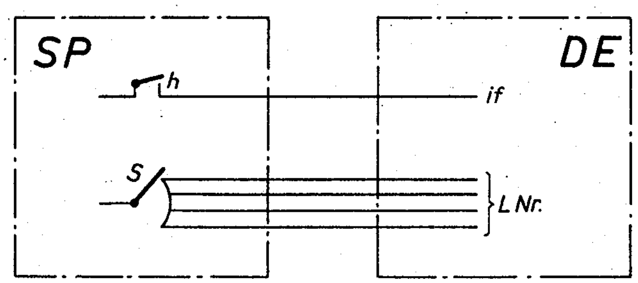
Fig. 3 shows a basic diagram for the automatic testing arrangement in conjunction with a trouble or fault printer.

Fig. 3 shows the principles of an arrangement in which the automatic testing arrangement SP, via a wiper *s* and a contact *h*, acts upon a printing facility DE, serving the recording of the traced troubles *if* and of the numbers of the respective lines LN*r* on paper tapes for a later evaluation.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A circuit arrangement for the automatic testing of lines with respect to their serviceability comprising a testing arrangement common to a plurality of lines, a plurality of blocking circuits the number of which corresponds to the expected number of disturbances, means in said testing arrangement for sequentially testing said lines, means partly in said testing arrangement responsive to a fault on a line for allocating a free blocking circuit to said line, said means including means for connecting said free blocking circuit to said line, and means in said blocking circuit for altering the condition of said line so as to block it.

2. A circuit arrangement, as defined in claim 1, in which the allocating means comprises means for seizing a free blocking circuit, a test circuit for the blocking circuit including the line being tested, and means for completing said test circuit.

3. A circuit arrangement, as defined in claim 2, in which the allocating means further comprises a finder switch in each blocking circuit, and means responsive to the seizure of said blocking circuit for operating said finder switch to hunt for and find the line which includes the test circuit completed by the testing circuit.

4. A circuit arrangement, as defined in claim 3, in which each blocking circuit comprises means responsive to the seizure thereof for blocking further seizure of said blocking circuit while it is in use, and means for applying a blocking potential to the line found by the finder thereof.

5. A circuit arrangement, as defined in claim 4, in which the means in the testing arrangement for sequentially testing the lines comprises a finder switch, and in which the means for seizing a blocking circuit comprises a chain circuit including a contact of each blocking circuit which contact when closed will connect the testing arrangement to the next blocking circuit in the chain, means for operating said contact when the associated blocking circuit has been connected to the line being tested, and means controlled by said operating means to cause said finder switch to disconnect itself from said line being tested, whereby it may hunt for another faulty line.

6. A circuit arrangement, as defined in claim 5, further comprising means in each blocking circuit for maintaining the operation of the means for applying the blocking potential after the finder switch of the testing arrangement has disconnected itself from the line being blocked by said potential.

7. A circuit arrangement, as defined in claim 5, further comprising an indicating device, and means for operating said indicating device when all of the blocking circuits are engaged.

8. A circuit arrangement, as defined in claim 3, further comprising a cut-off button in each blocking circuit, and means responsive to the operation of said cut-off button for releasing said blocking circuit.

9. A circuit arrangement, as defined in claim 5, further comprising an additional wiper in the finder switch of the testing arrangement, additional wiper in the finder switch of each of the blocking circuits and circuit connections between corresponding terminals of said finder switches, whereby additional information relative to the kind of traced disturbance may be transmitted from said testing arrangement to a seized blocking circuit.

10. A circuit arrangement, as defined in claim 1, further comprising recording apparatus, and means for connecting a seized blocking circuit to said recording apparatus for recording information relative to the line on which the disturbance has been found.

No references cited.